United States Patent [19]

Melling et al.

[11] Patent Number: 4,806,330
[45] Date of Patent: Feb. 21, 1989

[54] PROCESS FOR PREPARING HIGH PURITY ALUMINUM NITRIDE

[75] Inventors: Peter J. Melling, Worthington; Beebhas C. Mutsuddy, Lancaster, both of Ohio; Ibrahim Sekercioglu, Muskegon, Mich.

[73] Assignee: Battelle Memorial Institute, Columbus, Ohio

[21] Appl. No.: 57,579

[22] Filed: Jun. 2, 1987

Related U.S. Application Data

[63] Continuation-in-part of Ser. No. 843,473, Mar. 24, 1986, abandoned.

[51] Int. Cl.[4] ............................................. C01B 21/06
[52] U.S. Cl. ...................................................... 423/412
[58] Field of Search .......................................... 423/412

[56] References Cited

U.S. PATENT DOCUMENTS

3,307,908  3/1967  Mandorf ............................ 423/412
3,450,499  6/1969  Yates ................................. 423/412

FOREIGN PATENT DOCUMENTS

1396289  5/1964  France .............................. 423/412
2415     1/1971  Japan ............................... 423/412
217298   7/1968  U.S.S.R. ........................... 423/412

OTHER PUBLICATIONS

Myakinenkov et al, "Preparation of AlN", *Inorganic Materials*, vol. 10, No. 10, pp. 1635, 1636, Oct. 1974 (published Mar. 1975), Plenum Publishing Corporation.
Iwama et al, "Ultrafine Powders of TiN and AlN Produced by a Reactive Gas Evaporation Technique with Electron Beam Heating", *Journal of Crystal Growth*, 56 (1982), pp. 265-269, North-Holland Publishing Co.
*Handbook of Chemistry and Physics*, 55th Edition, p. B-64 (1974), Chemical Rubber Co.

*Primary Examiner*—John Doll
*Assistant Examiner*—Wayne A. Langel
*Attorney, Agent, or Firm*—Klaus H. Wiesmann

[57] ABSTRACT

Process for producing high purity aluminum nitride powder by reacting aluminum sulfide with gaseous ammonia at an intermediate temperature (about 700° C.) and holding at that temperature until an intermediate product ($Al_xN_yS_z$) is formed where x, y, and z are integers; then further heating to a temperature above 1100° C. and reacting with gaseous ammonia. A high purity, low oxygen containing, free flowing powder is produced. A posttreatment using a carbon source such as graphite further reduces the oxygen content. The oxygen content can be further reduced by reacting the aluminum nitride formed with carbon at about 1600° C.

12 Claims, 1 Drawing Sheet

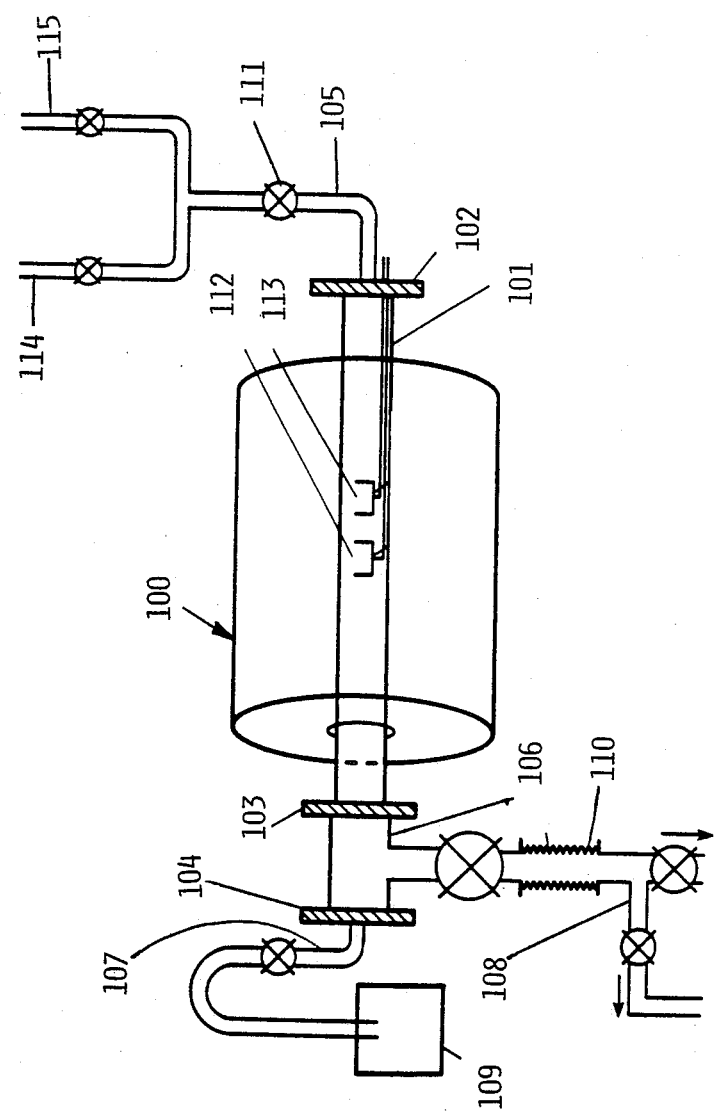

PROCESS FOR PREPARING HIGH PURITY ALUMINUM NITRIDE

The present application is a continuation in part of U.S. patent application Ser. No. 843,473, filed Mar. 24, 1986, entitled "Process for Preparing High Purity Aluminum Nitride", now abandoned.

FIELD OF THE INVENTION

This invention relates to the preparation of high purity aluminum nitride from aluminum sulfide and ammonia.

BACKGROUND OF THE INVENTION

Aluminum nitride can be prepared by a number of methods. Previous methods of preparation are briefly discussed below. All figures given in percent herein are weight percent.

One method utilizes carbothermic reduction of alumina under a nitrogen atmosphere according to the following reaction $$Al_2O_3 + 3C + N_2 \rightarrow 2AlN + 3CO \qquad (1)$$

This process is said to produce 98 percent AlN continuously. The major impurities of the product are said to be oxygen and carbon. Cooper, C. F., George, C. M., and Hopkins, S. W. J., "Preparation and Oxidation of Aluminum Nitride", In *Special Ceramics* 1962, Ed. by P. Popper, Published by the British Ceramic Association (1963).

Russian Pat. No. 217,298 teaches the production of aluminum nitride from aluminum containing minerals with carbon in an $N_2$ atmosphere in the presence of sulfur. Sulfur is used in the carbothermic reduction to assist in the removal of metallic impurities such as silicon and titanium. The amount of sulfur should not exceed that required to remove the metallic impurities as monosulfides to prevent the sulfur from reacting with the aluminum.

Shalom tried to use the same reaction to obtain aluminum oxynitride (AlON; $5AlN.9Al_2O_3$). The product obtained, however, was always on impure AlN when the reactants were mixed in stoichiometric amount (i.e., one $Al_2O_3$ to three C). The major impurity was again carbon. Moshe Ish-Shalom, "Formation of Aluminum Oxynitride by Carbothermal Reduction of Aluminum Oxide in Nitrogen", J. Material Science Letters, 1, 147–149 (1982). Kuramoto and Taniguchi also used the same reaction but they were able to reduce the carbon impurity to 0.15 percent level by a careful low temperature oxidation process. The resulting powder, however, contained less than 240 ppm metallic impurities and about 1.0 percent oxygen. Nevertheless, the powder was hot pressed or sintered to greater than 99 percent of the density using CaO as sintering aid. N. Kuramoto, H. Taniguchi, "Transparent AlN Ceramics", Ibid. 3, 471–474 (1984).

In U.S. Pat. No. 3,307,908 to Mandorf, aluminum metal in a finely divided carrier material such as AlN, AlF, or a mixture of the two Mandorf teaches against the presence of $H_2S$ since it interferes with the nitriding reaction.

To prepare ultrafine AlN powder and to avoid the carbon impurity Hock and Nair used $Al(OH)_3$ and amorphous $Al_2O_3$ powders prepared from the hydrolysis of aluminum alkoxide to react with $NH_3$ $$Al_2O_3 + 2NH_3 \rightarrow 2AlN + 3H_2O \qquad (2)$$

To avoid grain growth, the reaction was carried out at low temperatures (between 800 to 1350 C.). Although the reaction produced AlN, the amount present in the product was generally less than 80 percent. The main impurities were various polymorphs of $Al_2O_3$. Hoch, M. and Manikantar Nair, K., "Preparation and Characterization of Ultrafine Powders of Refractory Nitrides: I, AlN and $Si_3N_4$", Cer. Soc. Bull 58, [2], 187–190 (1979).

U.I. Myakinenkov et al teaches the use of volatile compounds of aluminum with nitrogen compounds to form films of AlN. The particular system described uses an organic compound of aluminum (triethyl aluminum, boiling point 194 C.) with hydrazine in a carrier gas. Reaction temperatures are 750 to 1100 C. Inorganic Materials, Vol. 10, No. 10, p. 1635–1636, October 1974 (Publ. March 1975).

Direct reaction of aluminum with nitrogen according to the reaction $$2Al + N_2 \rightarrow 2AlN \qquad (3)$$

is an exothermic reaction. This reaction is particularly suitable for large scale AlN production. The product of reaction (3) is a highly sintered mass. As a result, the grinding of the product is required. This grinding process itself can introduce impurities. Another common impurity of this reaction is unreacted aluminum metal. Cooper et al., used about 1 weight percent LiF as a catalyst to improve the kinetics of reaction (3). LiF was most effective compared to NaF, $KHF_2$ and $AlF_3$. Although they obtained relatively pure AlN powder (99.7 AlN that contained 0.009 percent free Al) the powders were not sinterable. Cooper, C. F., George, C. M., and Winter, L., Aluminum Nitride Crucibles: Raw Materials Preparation, Characterization and Fabrication, in *Special Ceramics*, Vol. 4., Ed. by P. Popper, Pub. by the British Ceramic Research Association, 1–3 (1968).

In earlier work Cooper et al (1963 above) used reaction (3) to obtain 99.8 to 99.9 percent pure AlN by levitating the reacting pear-shaped high purity aluminum ball in an electromagnetic field. A variation of the method involves vaporizing aluminum by striking a d.c. arc between two aluminum electrodes in a nitrogen atmosphere. About 80 percent of the AlN product forms as hard lumps on the electrode surfaces, the remaining 20 percent deposited as a fine, reactive powder in the reaction chamber. The analysis of the lumps showed that product contained 92 to 94 percent AlN. The fine powder contained about 25 percent AlN. The remaining portions considered to be free aluminum and $Al_2O_3$ impurities which are presumed to form as a result of $O_2$ leakage into the chamber. Heat treating these powders in vacuum at high temperature reduced their oxygen impurity and their reactivity to moisture. Long, G. and Foster, L. M., "Aluminum Nitride, Refractory for Aluminum to 2000 C.", J. Amer. Soc. 42, 53–59, (1959).

Sato and Iwata used the same technique of Long and Foster but they varied the nitrogen pressure. The maximum yield obtained (about 0.6 grams/hour) was between 4 and 6 atmospheres of nitrogen pressure. By heat treating the powder in vacuum at 1800 C., in the same manner described by Long and Foster, they reduced the oxygen content to 0.82 percent and other impurities to 0.01 percent level. Sato, T. and Iwata, M., "Preparation of AlN by Electric Arc Method", Nippon Kagaku Kaishi, 1869–1873, (1973).

Other techniques used include thermal decomposition of AlCl$_3$NH$_3$ complex and reduction of AlP by ammonia. These methods are likely to result in chlorine or phosphorous impurities in the AlN powder. S. Iwama describes a process for producing ultrafine powders of AlN by a reactive gas evaporation technique. Powdered aluminum nitride is produced by evaporating aluminum in an ammonia gas. An electron beam is used for heating. Use of nitrogen gas does not result in aluminum nitride. Journal of Crystal Growth 56 (1982) p. 265–269. Recently, Huseby described a method which involves the reaction of AlF$_3$ and NH$_3$ as shown in reaction (4)

$$AlF_{3(s)} + NH_{3(g)} \rightarrow AlN_{(s)} + 3HF_{(g)} \quad (4)$$

The particles of AlN powder produced by this method were rod shaped ranging in size from 1 to 10 microns. The oxygen content varied from 0.17 to 0.30 percent. Huseby, I. C., "Synthesis and Characterization of a High-Purity AlN Powder", J. American Cer. Soc. 66 [3], 217–220 (1983).

AlN is an electrically insulating ceramic material with very high thermal conductivity (>80 W/mK). To prepare such ceramics, however, it is required that the oxygen impurity must be reduced to the lowest possible level. A new process for reacting Al$_2$S$_3$ with NH$_3$ to produce high purity AlN is revealed below. The use of aluminum sulfide as the precursor material has not been previously reported to the knowledge of the inventor and represents a novel approach.

BRIEF DESCRIPTION OF THE INVENTION

The invention uses the reaction of aluminum sulfide with ammonia gas to obtain aluminum nitride. Post-treatment with a carbon source such as graphite provides a product having very low oxygen content.

BRIEF DESCRIPTION OF THE DRAWING

The drawing depicts a furnace arrangement used for controlled atmosphere thermal treatments.

DETAILED DESCRIPTION OF THE INVENTION AND PREFERRED EMBODIMENT

The method described in the present invention uses the reaction between aluminum sulfide and ammonia to produce aluminum nitride according to the reaction $$Al_2S_3 + 2NH_3 \rightarrow 2AlN + 3H_2S \quad (5)$$

To obtain high purity aluminum nitride, it is necessary to use high purity aluminum sulfide and react it with an ammonia atmosphere that has been rigorously purified to remove oxygen contamination. These reactions must be activated by heat or other means so they are normally carried out at temperatures in excess of 1100 C. In order to obtain a powdered product an intermediate holding step must be included as described below.

EXAMPLE 1

An impure 0.5 gram aluminum sulfide sample with a high oxygen content was placed in an alumina (Al$_2$O$_3$) boat which was then placed in a quartz tube in a horizontal tube furnace. The quartz tube was arranged so that flexible tubing could be attached to each end. At one end, gas was introduced and allowed to flow over the sample then out the other end, where it passed through a bubbler. After the aluminum sample sulfide was placed in the (22 C) furnace, the apparatus was purged at room temperature with a high flow of ammonia (200 cc/min for 10 minutes). The flow rate was then adjusted to 30 cc/min and the sample heated to 1050 C. at a heating rate of 5 C./min, held at 1050 C. for 3 hours, then cooled at approximately 2 C./min to room temperature while maintaining the flow of ammonia. The resulting powder was determined to be aluminum oxynitride by x-ray diffraction.

This example illustrated that higher purity aluminum sulfide is needed to prepare the aluminum nitride. The oxygen present was not reacted and removed by the ammonia but remained in the aluminum oxynitride product.

EXAMPLE 2

Reaction Between Al$_2$S$_3$ and NH$_3$

A 7.42 gm sample of Al$_2$S$_3$ was loaded into a sealed tube furnace in a molybdenum boat taking care to minimize contact with the ambient room atmosphere; then the furnace was evacuated with a diffusion pump. The sample was then heated under vacuum up to 200 C. when the atmosphere was replaced with ammonia (NH$_3$). The gas flow was maintained at 2 cc per minute and the heating rate controlled at about 7 C. per minute until the sample reached 650 C. The heating rate was reduced to 3 C. per minute until 700 C. where the sample was held for 1 hour 30 minutes. Heating was restarted at 7 C. per minute up to 1250 C. where the sample was held for 21 hours. The sample was allowed to cool under the ammonia atmosphere to room temperature then removed for analysis. A fine powdery product resulted which x-ray diffraction showed to be AlN.

A high quality, vacuum-tight glove box was used to store and manipulate the aluminum sulfide powder. To carry out the controlled atmosphere thermal treatments, a special apparatus was constructed (see Drawing). This consisted of molybdenum wound tube furnace 100, with a high density alumina tube 101 passing through the furnace hot zone. Vacuum tight, stainless steel end plates 102,103,104 were attached to each end of the tube 101. Stainless steel tubing 105,106,107,108 was connected to the end plates 102,103,104 so that the sample atmosphere could be evacuated then replaced with a flowing controlled atmosphere.

Tube 106 is really a T fitting that allows flow through either a bubbler 109 or flexible bellows 110 that connects to exhaust means not shown. Valves, of which valve 111 is typical, are used to control gas flow in the apparatus.

Samples may be placed at sample points 112 and 113. Thermocouples, not shown, were connected through a gland of one end plate 102, one of which was used to monitor the temperature and the other to monitor a reference sample of aluminum nitride. Gas from a gas supply means (not shown) enters at 114,115.

Because aluminum sulfide is sensitive to atmospheric water vapor the powder used in this work was received from the supplier in sealed glass ampoules. The sealed ampoules were placed in an argon glove box before being opened. Once the ampoules were opened, the aluminum sulfide was stored in the glove box and the material for each experiment was weighed into a molybdenum boat in the glove box. To limit contact with the ambient atmosphere, the aluminum sulfide samples were placed in a plastic box before being removed through the airlock of the glove box.

After loading, a vacuum was applied to the sample chamber and the sample heated to 150 C. The tube 101 was then filled with the desired atmosphere and a slow flow rate established. The furnace 100 was then heated at a controlled rate to the desired temperature and held for the required time. The time was calculated from the time the hold temperature was reached until the furnace was switched off. Cool-down followed the expected exponential decay.

Oxygen, nitrogen, and sulfur analyses were performed using an inert gas fusion technique. Surface analysis of some powders was performed using Electron Spectroscopy for Chemical Analysis (ESCA).

X-ray diffraction spectra were collected on a standard Norelco diffractometer with a vertical axis goniometer, spinning sample holder, and theta compensation slits.

Several tests were made using ammonia that are summarized in Table 1. X-ray diffraction (XRD) spectra were measured on all samples and those above 1000 C. gave good agreement with the JCPDS reference pattern (25-1133) for aluminum nitride. The pattern from the 1250 C. run is compared to the reference pattern in Table 2. All of those lines not accounted for by aluminum nitride are due to a minor alpha alumina impurity (JCPDS 10-123). The only significant differences between the XRD patterns of the samples treated at 1100 C. and above are in the line widths of the diffraction peaks which indicate a very fine crystal grain size.

TABLE 1
EXPERIMENTS PERFORMED AS A FUNCTION OF TIME, TEMPERATURE, AND ATMOSPHERE

| Time (hours) | Temperature (°C.) | Atmosphere |
|---|---|---|
| 22 | 1450 | Ammonia |
| 22 | 1350 | Ammonia |
| 22 | 1300 | Ammonia |
| 21 | 1250 | Ammonia |
| 17 | 1100 | Ammonia |
| 4 | 1100 | Ammonia |
| 2 | 1100 | Ammonia |
| 20 | 1000 | Ammonia |
| 46 | 900 | Ammonia |
| 16 | 900 | Ammonia |

TABLE 2
COMPARISON OF THE XRD PATTERN OF THE SAMPLE HEATED AT 1250° C. FOR 21 HOURS WITH THE REFERENCE XRD PATTERNS FOR ALUMINUM NITRIDE AND ALPHA ALUMINA

| Sample Pattern | | Reference AlN | | Rescaled | Reference $Al_2O_3$ | |
|---|---|---|---|---|---|---|
| d (A) | Int (%) | d (A) | Int (%) | Int (%) | d (A) | Int (%) |
| 3.5 | 11 | | | 75 | 3.499 | 75 |
| 2.7 | 100 | 2.69 | 100 | | | |
| 2.55 | 15 | | | 94 | 2.55 | 90 |
| 2.49 | 53 | 2.49 | 60 | | | |
| 2.37 | 69 | 2.37 | 80 | | | |
| 2.09 | 16 | | | 100 | 2.085 | 100 |
| 1.83 | 21 | 1.829 | 25 | | | |
| 1.72 | 6 | | | 36 | 1.74 | 45 |
| 1.6 | 14 | | | 84 | 1.6 | 80 |
| 1.56 | 34 | 1.56 | 40 | | | |
| 1.41 | 23 | 1.41 | 30 | | | |
| 1.38 | 5 | | | 34 | 1.374 | 50 |
| 1.35 | 3 | 1.35 | 5 | | | |
| 1.32 | 14 | 1.32 | 25 | | | |
| 1.30 | 6 | 1.30 | 10 | | | |
| 1.19 | 7 | | | 44 | 1.189 | 8 |

The variation of the line width at half height of the 110 peak as a function of treatment temperature is summarized in Table 3. Even at temperatures in excess of 1300 C. and times of 20 hours, the basic grain size is still in the region of 2000 to 3000 anstroms. The size of the majority of the particles observed in an electron microscope is much larger, with a wide distribution of sizes. The particles are all fully dense and with no internal porosity. The $Al_2O_3$ XRD peak intensity does not vary systematically with treatment temperature and is most likely a function of the level of exposure of the sample to atmospheric water vapor prior to firing. The effect of reaction time, however, can be clearly seen in the difference in XRD line width for the 1100 C. samples.

The low temperature range was examined because visual observation of the silicone oil gas bubbler showed that a cloudiness occurs when an ammonia atmosphere is being used and the sample temperature is above 700 C. This cloudiness clears during the course of the experiment.

TABLE 3
LINE WIDTH OF THE 110 PEAK OF ALUMINUM NITRIDE AS A FUNCTION OF TREATMENT TEMPERATURE

| Treatment Temperature (°C.) | Line Width (deg $2\theta$) |
|---|---|
| 1450 | 0.3 |
| 1300 | 0.45 |
| 1250 | 0.45 |
| 1100 (17 hours) | 0.65 |
| 1100 (4 hours) | 0.9 |
| 1000 | 2.0 |

Chemical analyses of powders prepared between 900 C. and 1300 C. were obtained for oxygen, nitrogen, and sulfur and the results are presented in Table 4. These results should be treated with caution because the total varies between approximately 90 and 110 percent, when stoichiometric amounts of aluminum are added to the totals. There is a trend in the 1100 C samples—the oxygen content increases with reduced time at temperature. This combined with the effect of time on the crystallite size suggests that at the shorter times the reaction is not complete. One sample (1250 C. and 21 hours) was analyzed for metallic impurities by spark source mass spectrometry and the elements which were detected are given in Table 5. ESCA was also used to analyze some samples to determine whether the oxygen is uniformly distributed through the powder or is concentrated at the surface. The ESCA results show a high level of oxygen contamination on the surface of the powders analyzed—in the region of 30 weight percent for most powders analyzed. This suggests that most of the oxygen content is on the surface of the powders and is consistent with the oxygen being incorporated by a surface reaction during handling of the powders.

TABLE 4

OXYGEN NITROGEN AND SULFUR CONTENTS OF AlN SAMPLES

| Time (hours) | Temperature (°C.) | Nitrogen (%) | Oxygen (%) | Sulfur (%) |
|---|---|---|---|---|
| 22 | 1300 | 28.5 | 4.5 | 0.17 |
| 28 | 1100 | 28.7 | 8.9 | 1.09 |
| 4 | 1100 | 27.2 | 9.5 | 1.87 |
| 2 | 1100 | 27.8 | 10.6 | 1.70 |
| 20 | 1000 | 24.9 | 12.6 | 4.40 |
| 22 | 900 | 24.3 | 11.2 | 10.30 |

TABLE 5

METALLIC IMPURITIES IN ALUMINUM NITRIDE PREPARED AT 1250° C. FOR 21 HOURS IN AMMONIA

| Element | ppm | Element | ppm | Element | ppm |
|---|---|---|---|---|---|
| Li | 20 | B | 20 | Na | 600 |
| Mg | 400 | Si | 600 | P | 0.4 |
| Cl | 1.5 | K | 100 | Ca | 10 |
| Ti | 4 | V | 0.4 | Cr | 2 |
| Mn | 6 | Fe | 20 | Ni | 1 |
| Cu | 200 | Zn | 0.2 | Sr | 10 |
| Nb | 4 | Mo | 20 | Cs | 10 |
| Ba | 400 | Ce | 20 | W | 2 |

Aluminum nitride can be prepared by the reaction of aluminum sulfide with ammonia at temperatures above 1100 C. Below 1100 C., reactions occur but the product is not pure aluminum chloride, although the x-ray diffraction pattern is very similar. Even reaction times of up to 46 hours at 900 C. were not sufficient to complete the reaction. At 1100 C. and above, aluminum nitride is the product of the reaction between aluminum sulfide and ammonia and the product has a crystallite size in the range which causes x-ray line broadening. These grains are formed into dense agglomerates with a wide range of particle size which should give a high packing density in green bodies. The oxygen content of the most pure sample is 4.5 weight percent which is higher than the required level. A major source of oxygen contamination is the transfer step between the glove box and the furnace and during the sealing of the furnace. In this part of the process, the aluminum sulfide was exposed to ambient air with consequent reaction between water vapor and the aluminum sulfide to form an aluminum oxide impurity which remains in the final product. Other possible sources of oxygen contamination are (1) water vapor in the reactant gases, (2) oxygen in the reactant gases which will react with the aluminum sulfide at high temperatures and (3) reaction of the product aluminum nitride with atmospheric water vapor prior to analysis. Each of these potential sources of impurity are capable of being overcome by appropriate design of the equipment and production procedures.

The samples are purified of contaminating sulfur molecules by the continuous flow of gases. The equipment and general procedures were the same as described for Example 2. To further increase purity all sources of contaminants such as the tube etc. could be made of or lined with AlN.

EXAMPLE 3

The reaction tube was first flushed with argon. 25 grams of aluminum sulfide was loaded into a molybdenum boat as in the previous examples taking care that oxygen contamination was avoided. A programmed heating schedule was used as follows:

TABLE 6

SAMPLE TEMPERATURE PROFILE VERSUS TIME

| Time (Min.) | Temp. Setting (C.) |
|---|---|
| 0–40 | 175 |
| 40–80 | 350 |
| 80–120 | 425 |
| 120–160 | 700 |
| 160–380 (holding period) | 700 |
| 380–420 | 950 |
| 420–480 | 1435 |
| 480–1320 (final reaction period) | 1435 |
| 1320–end of test (cool down) | off |

25 cc/min of ammonia gas was supplied to the reactor when the heating cycle started. During the cool down period after 21 hours, when the reaction was considered complete, and the temperature had dropped to about 1000 C. the flow of ammonia was reduced by one half and nitrogen substituted to maintain the same gas flow. At the end of 22 hours when the temperature had dropped to 740 C. the flow of ammonia was cut off and only nitrogen gas flowed till ambient conditions were obtained. A white powdery material having 13.5 grams net weight was obtained.

EXAMPLE 4

Aluminum sulfide was treated in the manner of the previous example but held at a final reaction temperature of 1350 C. for 19 hours in a molybdenum boat using one atmosphere of flowing ammonia. Aluminum nitride with an oxygen content of 2.6 weight percent was obtained. A series of experiments to reduce the oxygen content of this material were conducted and were successful in obtaining powder with an oxygen content of about 0.5 weight percent. This was achieved by mixing 2 to 3 weight percent oxygen content aluminum nitride powder with fine graphite powder and heat-treating the mixed powder at 1600 C. for one hour in a high purity nitrogen atmosphere. The effect of carbon content is summarized in Table 7.

TABLE 7

EFFECT OF CARBON CONTENT ON IMPURITY LEVELS IN AlN

| Added Carbon (wt %) | Sample Type | Final Content | | |
|---|---|---|---|---|
| | | Carbon (wt %) | Oxygen (wt %) | Sulfur (wt %) |
| 0 | Powder | ND | 3.2 | .588 |
| 1.15 | Pellet | ND | 2.2 | .087 |
| 1.5 | Pellet | ND | 1.7 | .096 |
| 3.45 | Pellet | 0.296 | 0.51 | .513 |
| 4.5 | Pellet | 1.32 | 0.401 | .523 |
| 4.5 | Powder | 1.49 | 0.513 | .625 |

In the first tests with a carbon posttreatment, the carbon was mixed (slurried) with AlN in hexane, then dried. The mixture was then pressed into a pellet. All of these operations were performed in a glove box. Further experimentation showed that the slurry and pelletization steps are unnecessary and that a simple dry mixing is all that is required.

To elucidate the role of carbon in the posttreated powder the ESCA spectrum of the 0.296 weight percent carbon sample was measured. This spectrum showed a higher oxygen content than the bulk value, suggesting that the oxygen contamination is concentrated on the surface of the particles. The carbon peak was asymmetric and could be resolved into three components. These components were assigned to carbon bound to oxygen (pump oil), graphitic carbon, and bound carbon, such as aluminum carbide. The carbon assigned to pump oil accounts for only 12 percent of the peak area; while the central peak, carbon assigned to graphite, accounts for 47 percent of the area, and bound carbon accounts for 40 percent of the peak area.

Scanning electron microscopy (SEM) examination of the postteated powder showed that it has a primary particle size of less than one micron and this is formed into agglomerates. This same morphology is present in powder that had not been posttreated, so it is not caused by the posttreatment step. This morphology is different from that observed in Example 2 where dense agglomerates with widely varying particle size were found. Determination of the surface area of the posttreated powder, using the BET method, gave a surface area of 1.2 m$^2$/g. The surface area of the powder before posttreatment is 1.4 m$^2$/g so the posttreatment step does not have a major effect on the surface area.

Low-oxygen-content aluminum nitride can be prepared by nitridation of aluminum sulfide with ammonia, followed by a posttreatment with carbon in a nitrogen atmosphere. For Examples 3 and 4 pure semiconductor-grade gases were used, so sources of contamination from water vapor and oxygen in the furnace atmosphere have been reduced to a minimum. The experimental procedure for transferring aluminum sulfide from the glove box to the furnace was greatly improved, but is still a potential source of oxygen contamination; although larger batches are less prone to contamination from this source. Purification of the aluminum sulfide was not attempted. Further reduction in contaminants is possible by improving the quality of the aluminum sulfide used in the nitridation step.

Further process improvements will allow the production of aluminum nitride of lower oxygen content. Where even lower oxygen content is required and a small amount of carbon contamination in the final product can be tolerated the additional carbon treatment step is of great value.

The carbon can also be added to the nitrided powder as an organic binder during the forming process. The organic binder is then pyrolyzed in a nitrogen or argon atmosphere between 600 C. and 1000 C. The pyrolysis of the organic binder provides sufficient carbon to remove oxygen from the aluminum nitride product at 1550 to 1700 C. Examples of materials suitable for carbon sources are high purity graphite, phenolic resins, polymers and the like.

In general, the process may be described as a process for producing high purity aluminum nitride by providing a supply of aluminum sulfide; providing a supply of gaseous ammonia; heating and reacting the aluminum sulfide with the gaseous ammonia at a temperature of 650 to 800 C. at a pressure and for a time adapted to produce an intermediate; heating and further reacting the intermediate and gaseous ammonia at a temperature between 1100 C. and 1500 C., and at a pressure and for a time adapted to produce high purity aluminum nitride. While reaction (5) will proceed at temperatures above 1100 C. a temperature range of about 1200 C. to 1500 C. is preferred. The pressure is preferably at about atmospheric pressure although a higher pressure may increase the reaction rate.

The examples give specific reaction times, the reaction time will vary depending on operating conditions such as temperature of the holding step, particle size, the pressure used and the degree to which the reaction is required to go to completion. To achieve reasonable rates of reaction, reaction times of 1 to 4 hours for the holding step and 2 to 30 hours for the final reaction step are preferred. The time required to form an intermediate product at the holding step will vary with conditions such as sample size, ammonia gas flow rates, temperature etc.

The optimum time for a specific reaction to go to completion will need to be determined or excess time allowed to assure that the reaction goes to completion. This can easily be done by those skilled in the art knowing the teaching of the present invention.

It is believed that an $Al_xN_yS_z$ intermediate is formed where x, y and z are integers. Although this is the mechanism presently believed to apply, applicants do not wish to be bound by any particular formula for the intermediate. For those skilled in the art, it will be appreciated that formation of the intermediate needs to go to completion prior to heating the intermediate above 1100 C. and reacting it further with gaseous ammonia to form the powdered AlN product.

The holding step is preferably performed at a temperature between 650 and 800 C. for a time period sufficient to form the intermediate. This time period will vary from 1 to 4 hours.

An alternative to holding the temperature constant in the range of 650 to 800 C. is the very slow heating of the aluminum sulfide through the temperature range of 650 to 800 C. Slowly heating the aluminum sulfide within this temperature range produces the same intermediate product as if the aluminum sulfide had been held at a constant temperature.

While pure gaseous ammonia has been used in the examples the ammonia may be mixed with gaseous nitrogen, argon, helium, neon, krypton or mixtures thereof. Addition of these gases modifies the reaction rates at the intermediate holding step at about 650 to 800 C. and at the final reaction step to form aluminum nitride above 1100 C. These gases may be added to the ammonia at either step alone or at both steps.

The precursor aluminum sulfide material can be prepared by reacting aluminum with sulfur or H$_2$S as shown by reactions (6) and (7)

$$2Al + 3S \rightarrow Al_2S_3 \qquad (6)$$

$$2Al + 3H_2S \rightarrow Al_2S_3 + 3H_2 \qquad (7)$$

Methods for reactions (6) and (7) are further described in Ferrante, M. J. Stre, J. M. Ko, H. C., and Brown R. R., "Thermodynamic Properties of Aluminum Sulfide (Al$_2$S$_3$) High Temperature Science, 14, 91–101 (1981); Comprehensive Inorganic Chemistry, Ed. by J. C. Bailar, et al, Vol. 1, 1037, Pergamon Press (1973); and Handbook of Preparative Inorganic Chemistry, Vol. 1, 2nd Ed., p. 823, Ed. by George Brauer, Academic Press (1963).

An advantage of the process by using reactions (5) and (6) or (7) is that there are no oxygen or carbon containing compounds involved in the reactions. The process thus offers the ability to prepare aluminum nitride without these impurities. In all of the above reactions special precautions should be taken to prevent oxygen or moisture from entering the system before or during the reactions. Also, the aluminum sulfide, and ammonia, reactants as well as the nitrogen, and argon flush gases must be protected at all times from contamination by oxygen, moisture or other impurities.

While the forms of the invention herein disclosed constitute presently preferred embodiments, many others are possible. It is not intended herein to mention all of the possible equivalent forms or ramifications of the invention. It is to be understood that the terms used herein are merely descriptive rather than limiting, and that various changes may be made without departing from the spirit or scope of the invention.

I claim:

1. A process for producing high purity aluminum nitride powder comprising:
   a. providing a supply of aluminum sulfide;
   b. providing a supply of gaseous ammonia;
   c. heating and reacting the aluminum sulfide with the gaseous ammonia at a temperature of 650 C. to 800 C. at about atmospheric pressure for a time period of 1 to 4 hours adapted to produce an intermediate; and
   d. heating and further reacting the intermediate and gaseous ammonia at a temperature between 1100 to 1500 C., and at about atmospheric pressure for a time period of about 2 to 30 hours adapted to produce a powdered high purity aluminum nitride.

2. The process of claim 1 further comprising: providing the supply of aluminum sulfide as a powder and producing a high purity powdered aluminum nitride.

3. The process of claim 1 further comprising providing a supply of gas selected from the group consisting of argon, helium, neon, krypton, nitrogen or a mixture thereof and mixing the gas with the gaseous ammonia prior to heating and reacting the ammonia.

4. The process of claim 1 further comprising:
   a. providing a supply of carbon;
   b. providing a supply of gaseous nitrogen;
   c. mixing the powdered high purity aluminum nitride with the carbon; and
   d. heating and reacting the aluminum nitride and carbon in a nitrogen atmosphere at a temperature of 1550 to 1700 C. to obtain an aluminum nitride powder of reduced oxygen content.

5. The process of claim 4 wherein the supply of carbon is selected from the group consisting of powdered graphite, phenolic resins and polymers.

6. The process of claim 4 wherein the carbon is mixed as an organic binder and is pyrolized in a nitrogen atmosphere between 600 and 1000 C. prior to step d.

7. A process for producing high purity aluminum nitride powder comprising:
   a. providing a supply of aluminum sulfide;
   b. providing a supply of gaseous ammonia;
   c. heating and reacting the aluminum sulfide with the gaseous ammonia at a temperature of 650 C. to 800 C. at a pressure higher than atmospheric pressure for a time period of 1 to 4 hours adapted to produce an intermediate; and
   d. heating and further reacting the intermediate and gaseous ammonia at a temperature between 1100 to 1500 C., and at a pressure higher than atmospheric for a time period of about 2 to 30 hours adapted to produce a powdered high purity aluminum nitride.

8. The process of claim 7 further comprising: providing the supply of aluminum sulfide as a powder and producing a high purity powdered aluminum nitride.

9. The process of claim 7 further comprising providing a supply of gas selected from the group consisting of argon, helium, neon, krypton, nitrogen or a mixture thereof and mixing the gas with the gaseous ammonia prior to heating and reacting the ammonia.

10. The process of claim 7 further comprising:
    a. providing a supply of carbon;
    b. providing a supply of gaseous nitrogen;
    c. mixing the powdered high purity aluminum nitride with the carbon; and
    d. heating and reacting the aluminum nitride and carbon in a nitrogen atmosphere at a temperature of 1550 to 1700 C. to obtain an aluminum nitride powder of reduced oxygen content.

11. The process of claim 10 wherein the supply of carbon is selected from the group consisting of powdered graphite, phenolic resins and polymers.

12. The process of claim 10 wherein the carbon is mixed as an organic binder and is pyrolized in a nitrogen atmosphere between 600 and 1000 C. prior to step d.

* * * * *